(12) United States Patent
Vanderhaegen et al.

(10) Patent No.: US 9,672,136 B2
(45) Date of Patent: Jun. 6, 2017

(54) CROSSTALK EMULATOR FOR XDSL CABLE

(75) Inventors: Dirk Vanderhaegen, Wemmel (BE); Bart Hillaert, Putte (BE); Wim Troch, Kapelle-op-den-Bos (BE)

(73) Assignee: Alcatel Lucent, Boulogne-Billancourt (FR)

( * ) Notice: Subject to any disclaimer, the term of this patent is extended or adjusted under 35 U.S.C. 154(b) by 1043 days.

(21) Appl. No.: 13/878,900

(22) PCT Filed: Nov. 23, 2011

(86) PCT No.: PCT/EP2011/070747
§ 371 (c)(1),
(2), (4) Date: Jun. 28, 2013

(87) PCT Pub. No.: WO2012/072455
PCT Pub. Date: Jun. 7, 2012

(65) Prior Publication Data
US 2013/0275115 A1    Oct. 17, 2013

(30) Foreign Application Priority Data
Nov. 30, 2010   (EP) .................................... 10306316

(51) Int. Cl.
*G06F 9/455*     (2006.01)
*G06F 11/36*    (2006.01)
(Continued)

(52) U.S. Cl.
CPC ............ *G06F 11/3652* (2013.01); *H04B 3/32* (2013.01); *H04B 3/487* (2015.01)

(58) Field of Classification Search
CPC ........ G06F 11/3652; H04B 3/487; H04B 3/32
(Continued)

(56) References Cited

U.S. PATENT DOCUMENTS

2005/0030884 A1 * 2/2005 Kim ...................... H04B 3/23
370/201

OTHER PUBLICATIONS

De Leo R et al: "Scattering matric approach for frequency and time domain crosstalk analysis in multilayer PCBs", IEE Proceedings: Science, Measurement and Technology, IEE, Stevenage, Herts, GB, vol. 142, No. 3, May 1, 1995 (May 1, 1995), pp. 206-212, XP006004420, ISSN: 1350-2344, DOI: DOI: 10.1049/IP-SMT:19951785 p. 207, left-hand column, paragraph 2-p. 208, paragraph 3.

(Continued)

*Primary Examiner* — Dwin M Craig
(74) *Attorney, Agent, or Firm* — Harness, Dickey & Pierce, P.L.C.

(57) ABSTRACT

A crosstalk emulator for a cable, preferably a xDSL telecommunication cable, represented by several emulation paths each comprising a first segment (L1a/L4a) serially connected to a second segment (L1b/L4b) on a printed circuit board PCB. The first and second segments of a same emulation path form an angle, e.g. of about 90 degrees, at their junction point. All the emulation paths have a same length and preferably run in parallel over the PCB. As a result, each emulation path crosses only once (X21) any other emulation path at a cross-point. Furthermore, the area occupied by the crosstalk emulator on the PCB is reduced with respect to a matrix topology, whereby the present topology can easily be extended to large numbers of couplings, allowing design guidance for a passive coupling emulator with a large amount of coupling elements (CP) at the cross-points.

15 Claims, 5 Drawing Sheets

(51) Int. Cl.
*H04B 3/32* (2006.01)
*H04B 3/487* (2015.01)

(58) Field of Classification Search
USPC .......................................................... 703/24
See application file for complete search history.

(56) References Cited

OTHER PUBLICATIONS

Park S-W et al: "Crosstalk Analysis for Embedded-Line Structure at PCB Using Circuit-Concept Approach", IEICE Transactions on Communications, Communications Society, Tokyo, JP, vol. E92B, No. 6, Jun. 1, 2009 (Jun. 1, 2009), pp. 1945-1952, XP001547330, ISSN: 0916-8516, DOI: DOI: 10.1587/TRANSCOM.E92.B.1945 p. 1947, paragraph 2.3-p. 1950, paragraph 3.
International Search Report PCT/ISA/210 for International Application No. PCT/EP2011/070747 dated Feb. 13, 2012.

* cited by examiner

CCE1

CROSSTALK EMULATOR FOR XDSL CABLE

The present invention relates to a crosstalk emulator for a cable comprising a plurality of wires, each wire of said plurality corresponding to a distinct emulation path on a printed circuit board PCB of said crosstalk emulator, each emulation path comprising a first segment serially connected to a second segment, and all the emulation paths of said plurality being arranged to cross each other on different layers at predetermined cross-points.

When the impact of dynamic crosstalk of multiple disturbers needs to be tested in the lab on telecommunication products, typically a real cable, preferably a xDSL cable, has to be used.

The disadvantage of using a real cable is the non-reproducible environment over different test labs. This can jeopardize the multi-site or parallel testing of equipment of which the performance is depending on the characteristics of real cable. In addition, the flexibility to configure various deployment scenarios is limited on a real cable, preventing the emulation of specific test conditions which occur in the real application.

This can be solved by using a crosstalk emulator platform implemented by means of coupling elements.

Such a crosstalk emulator platform generally has the shape of a matrix as shown at FIG. 1 wherein a wire of the cable corresponds to one emulation path having first segment L1a/L4a that is a vertical line (column) and a second segment L1b/L4b that is a horizontal line (row) of the matrix. At the cross-points, the horizontal and the vertical line are isolated from each other. In more detail, for representing N=4 wires, a 4×4 crosstalk emulator matrix is used. Each first segment L1a/L4a has a first segment input L1ai/L4ai and a first segment output L1ao/L4ao, and each second segment L1b/L4b has a second segment input L1bi/L4bi and a second segment output L1bo/L4bo.

The emulation paths are completed by wires interconnecting the first segment outputs to the corresponding second segment inputs.

In this way, each emulation path crosses at least all of the other emulation paths at two cross-points, such as X12 or X21, and also crosses itself at cross-points such as X11 and X44.

In order to achieve the constraints, especially of high frequency, i.e. DSL telecommunication, the track lengths or lengths of each emulation path should be kept equal in order to limit differential delay difference between the wires or their corresponding emulation paths. To this end, the interconnecting wires between the first segments outputs and the second segments inputs are chosen of equal length. However, in that case, unavoidable additional cross-points XE between the interconnecting wires negatively affect the measurements because these crosstalk measurements should only be related to the cross-points between the different emulation paths within the matrix.

To avoid this problem of unwanted cross-points between the interconnecting wires, the emulation matrix of FIG. 2 is proposed. Therein, the second segments L1b–L4b or horizontal lines (rows) of the matrix are disposed in the reverse order with respect to those of FIG. 1; the first segments L1a–L4a or vertical lines (columns) remaining in the same order, or vice versa. As a result, the wires interconnecting the first segment outputs L1ao–L4ao with the corresponding second segment inputs L1bi–L4bi do no longer cross each other. However, in this approach, the interconnecting wires are of different length, which is also not acceptable for DSL telecommunication measurements.

Again this matrix layout has the additional issue of providing unnecessary double cross-points between different emulation paths, such as X12 or X21, as well as unnecessary cross-points, such as X11 and X44, between first segments and second segments of a same emulation path. It is not needed to have the double cross-points, as typically the elements that generate the crosstalk for these cross-points are bi-directional.

The matrix shaped crosstalk emulator platform is also not suited for a large number N of coupling elements (e.g. N>2000).

An object of the present invention is to provide a crosstalk emulator of the above type but optimized in that the emulation paths are all of the same length, and in that unnecessary cross-points between segments of a same emulation path and/or between interconnecting wires crossing each other are avoided.

According to a characterizing embodiment of the present crosstalk emulator, this object is achieved due to the fact that, for each emulation path, one end of a said first segment is a first segment output and one end of a said second segment is a second segment input, that, for each emulation path, said first segment output is connected to said second segment input at a junction point so that said first and second segments form an angle at said junction point, and that each emulation path of said plurality crosses only once any other emulation path of said plurality at one predetermined cross-point.

In this way, the junction points advantageously replace the interconnecting wires between the first segment outputs and the second segment inputs of a same emulation path. It is easy to avoid different lengths of emulation paths and cross-points between interconnecting wires.

Moreover, by making an angle, e.g. of about 90°, between the first segment and the second segment of a same emulation path, each emulation path only crosses once the other emulation paths of the plurality, and a first segment can no longer cross a second segment of the same emulation path. As a consequence, the area occupied by the crosstalk emulator on the PCB is dramatically reduced with respect to the matrix topology.

The present topology for crosstalk emulator or printed circuit routing can easily be extended to large numbers of couplings, allowing design guidance for a passive coupling emulator with a large amount of coupling elements.

Another characterizing embodiment of the present crosstalk emulator is that a coupling element is provided in the proximity of a cross-point between two emulation paths.

In a preferred characterizing embodiment the ends of the coupling element, connected to segments of two distinct emulation paths, are as short as possible.

Also another characterizing embodiment of the present crosstalk emulator is that said cable further comprises a second plurality of wires, each wire of said second plurality corresponding to a distinct emulation path on said printed circuit board PCB of said emulator, that the emulation paths corresponding to the wires of said second plurality are arranged in a similar way as the emulation paths corresponding to the wires of the first mentioned plurality, that the emulation paths of said first plurality are located on a first area of said printed circuit board PCB, and that the emulation paths of said second plurality are located on a second area of said printed circuit board PCB.

In a preferred characterizing embodiment, said cable is a DSL telecommunication cable comprising a plurality of differential telecommunication pairs of wires, e.g. tip and ring, and said first plurality of emulation paths corresponds to a first set of wires comprising the first wire of each of said pairs, whilst said second plurality of emulation paths corresponds to a second set of wires comprising the second wire of each of said pairs.

By locating the emulation paths of the first and of the second crosstalk emulators on different areas or layers of the printed circuit board PCB, it becomes possible to achieve that they do affect each other during the measurements in a controlled way.

In another characterizing embodiment, a crosstalk emulator arrangement is provided, this crosstalk emulator arrangement comprising four similar crosstalk emulators each comprising N emulation paths. For each emulation path of a first crosstalk emulator, the first segment output is disconnected from the second segment input, and for each emulation path of a second crosstalk emulator, the first segment output is disconnected from the second segment input. The first segment inputs of said first and second crosstalk emulators constitute the 2N emulation path inputs of said crosstalk emulator arrangement. The disconnected junction points of said first and second crosstalk emulators are replaced by connections wherein each first segment output of said first crosstalk emulator is connected to a distinct second segment input of said second crosstalk emulator, and each first segment output of said second crosstalk emulator is connected to a distinct second segment input of said first crosstalk emulator, and wherein these connections may constitute N additional cross-points. Each second segment output of said first crosstalk emulator is connected to a distinct first segment input of a third crosstalk emulator, and each second segment output of said second crosstalk emulator is connected to a distinct first segment input of a fourth crosstalk emulator. Finally, the second segment outputs of said third and fourth crosstalk emulators constitute the 2N emulation path outputs of said crosstalk emulator arrangement.

In this way, a double-sized crosstalk emulator or crosstalk emulator arrangement with 2N emulation paths is obtained by the interconnection of four crosstalk emulators with N emulation paths each.

Further characterizing embodiments of the present crosstalk emulator are mentioned in the appended claims.

It is to be noticed that the terms "comprising" or "including", used in the claims, should not be interpreted as being restricted to the means listed thereafter. Thus, the scope of an expression such as "a device comprising means A and B" should not be limited to an embodiment of a device consisting only of the means A and B. It means that, with respect to embodiments of the present invention, A and B are essential means of the device.

Similarly, it is to be noticed that the term "coupled", also used in the claims, should not be interpreted as being restricted to direct connections only. Thus, the scope of the expression such as "a device A coupled to a device B" should not be limited to embodiments of a device wherein an output of device A is directly connected to an input of device B. It means that there may exist a path between an output of A and an input of B, which path may include other devices or means.

The above and other objects and features of the invention will become more apparent and the invention itself will be best understood by referring to the following description of an embodiment taken in conjunction with the accompanying drawings wherein.

The present crosstalk emulator is build on a printed circuit board PCB and allows to couple a large amount of differential pairs of wires (e.g. 2×50 tracks) to emulate a real xDSL cable. Tracks from different lines can be relatively far from each other for reducing unwanted crosstalk, and preferably routed on only a few layers of the PCB. It is further to be ensured that each line or emulation path meets all the other lines at separate cross-points.

Figure 1:
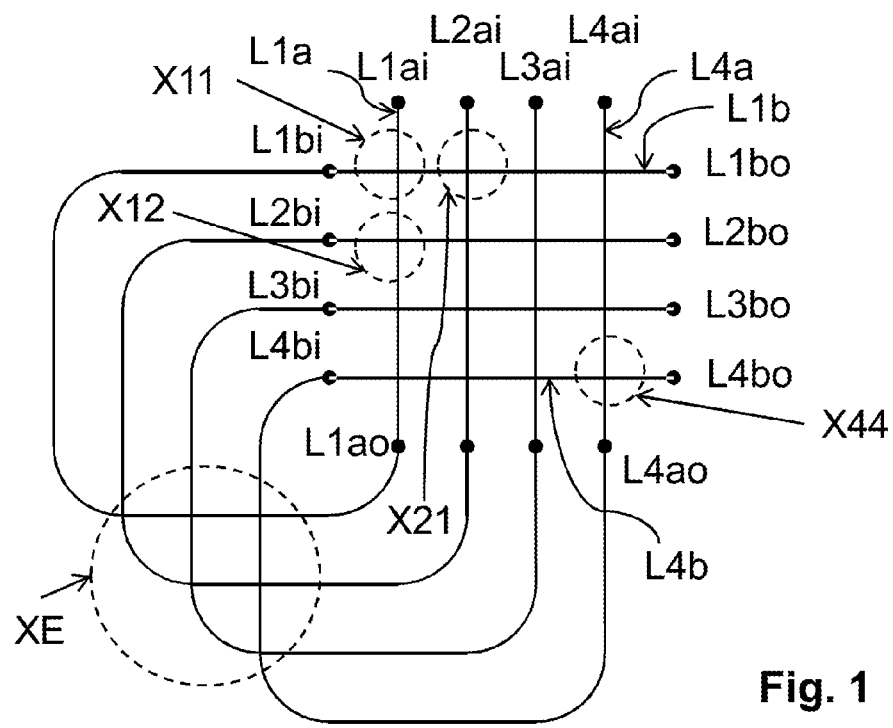
FIG. 1 shows a crosstalk emulator with a matrix topology as known from the art.
Figure 2:
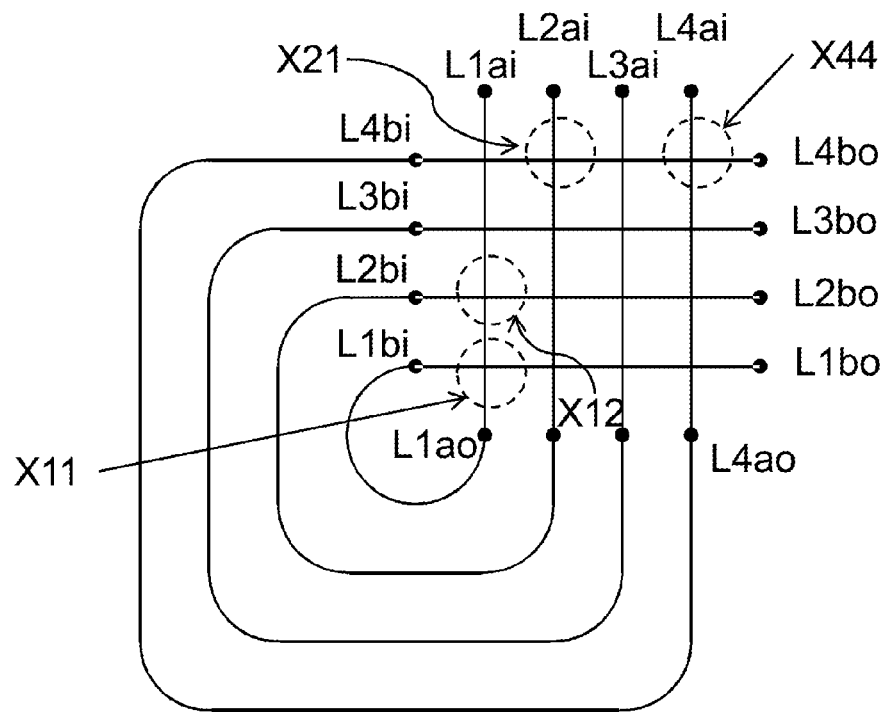
FIG. 2 shows a variant of the matrix shaped crosstalk emulator of FIG. 1.
Figure 3:
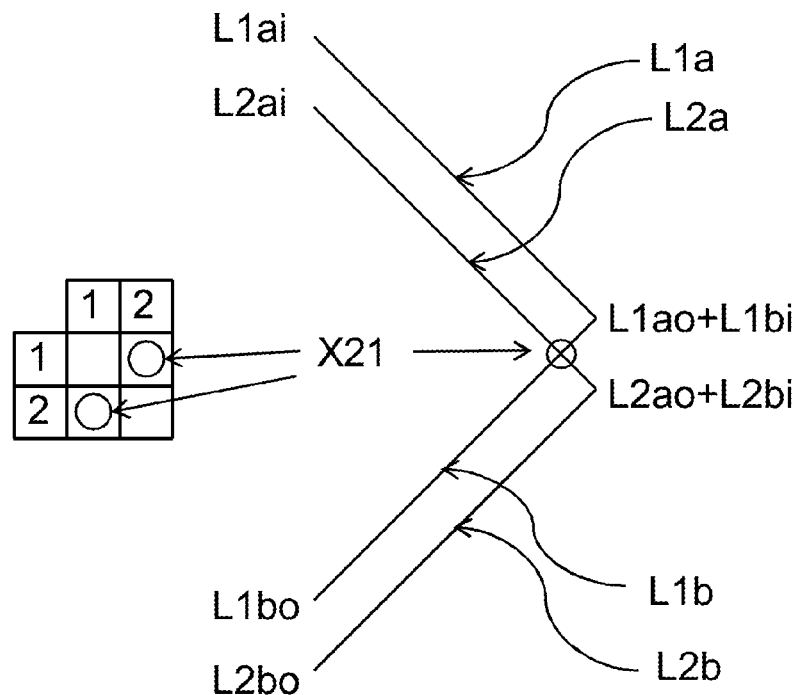
FIG. 3 shows two emulation paths of an embodiment of the crosstalk emulator according to the invention, and a table indicating the cross-points between the paths.

To this end, instead of using the matrix topology as shown at FIGS. 1 and 2, and described above, another layout of the emulation paths on the PCB is preferred. In this layout of the crosstalk emulator, as shown at FIG. 3 for two emulation paths, each wire of the xDSL cable corresponds to a distinct emulation path on the printed circuit board PCB. A first emulation path is constituted by a first segment L1$a$ serially connected to a second segment L1$b$, whilst the second emulation path is constituted by another first segment L2$a$ serially connected to another second segment L2$b$.

The first segments L1$a$, L2$a$ all have a same predetermined length, run in parallel, and are evenly spread over the PCB. The same is true for the second segments L1$b$, L2$b$. The lengths of first segments are preferably, but not obligatory, equal to the lengths of the second segments. This is especially important at high frequency operations.

The first emulation path has an emulation path input L1$ai$ which is a first segment input at one end of the first segment L1$a$, whilst the other end of the first segment L1$a$ is a first segment output L1$ao$. The first emulation path further has an emulation path output L1$bo$ which is a second segment output at one end of the second segment L1$b$ path, whilst the other end of the second segment L1$b$ is a second segment input L1$bi$.

The first segment output L1$ao$, L2$ao$ of each emulation path is connected to the second segment input L1$bi$, L2$bi$ of the same path at a junction point L1$ao$+L1$bi$, L2$ao$+L2$bi$ so that the first and second segments form an angle, preferably of about 90 degrees, at their junction point.

As a result, each emulation path crosses only once any other emulation path of the crosstalk emulator.

In more detail, the second segment L1$b$ of the first emulation path crosses the first segment L2$a$ of the second emulation path at a cross-point X21. This cross-point X21 can be represented in a table, as shown at FIG. 3, where it represents the crosstalk from path 1 to path 2 and vice versa. As no emulation path crosses itself, the diagonal of this table is empty.

Figure 4:
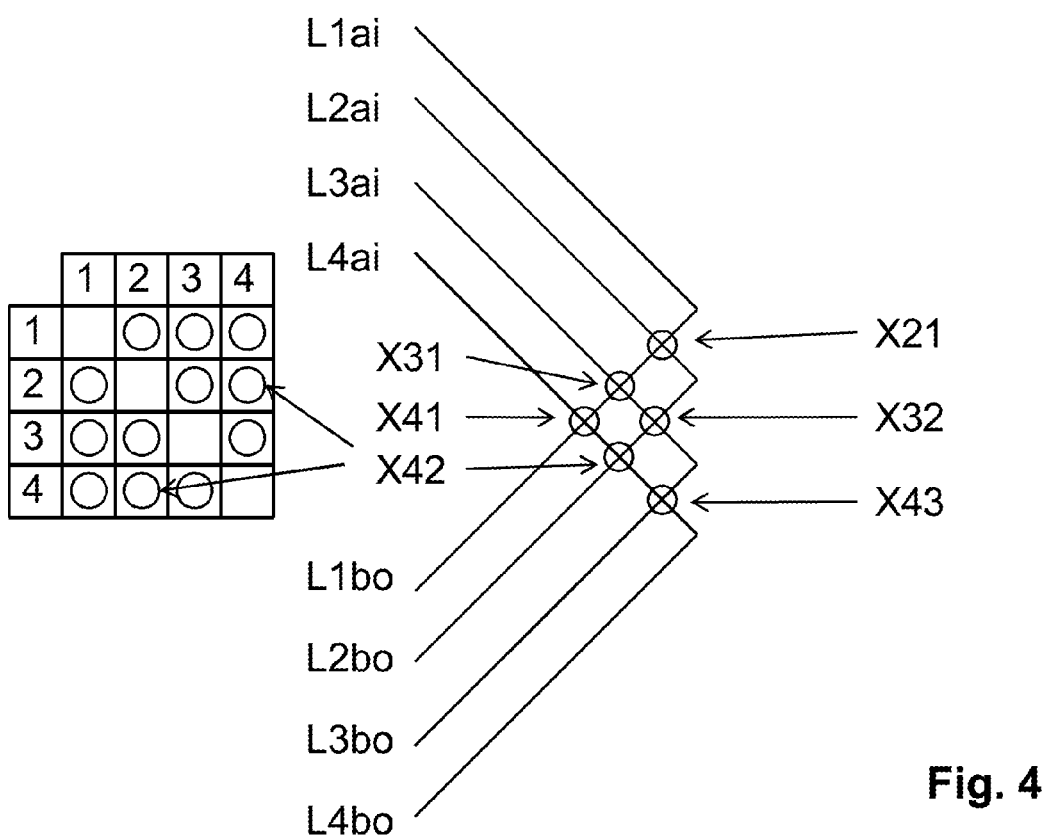
FIG. 4 shows an embodiment of the crosstalk emulator with N=4 emulation paths, and a table indicating the cross-points between the paths.

The FIG. 4 further illustrates an extended topology with N=4 emulation paths on a printed circuit board routing.

This topology has N=4 emulation path inputs L1ai to L4ai and 4 emulation path outputs L1bo to L4bo. The second segment L1b of the first emulation path crosses the first segments L2a, L3a and L4a of the second, third and forth emulation paths at cross-points X21, X31 and X41 respectively. Furthermore, the second segment L2b of the second emulation path crosses the first segment L3a of the third emulation path at cross-point X32, and the first segment L4a of the fourth emulation path at cross-point X42. Finally, the second segment L3b of the third emulation path crosses the first segment L4a of the fourth emulation path at cross-point X43. These elements can again be entered in a table, as shown at FIG. 4, where the example cross-point X42 is indicated.

It clearly appears from this layout that only the 6 necessary cross-points are created by the present topology.

This substantially perpendicularly crossing between the emulation paths reduces the uncontrolled crosstalk even further.

Figure 5:
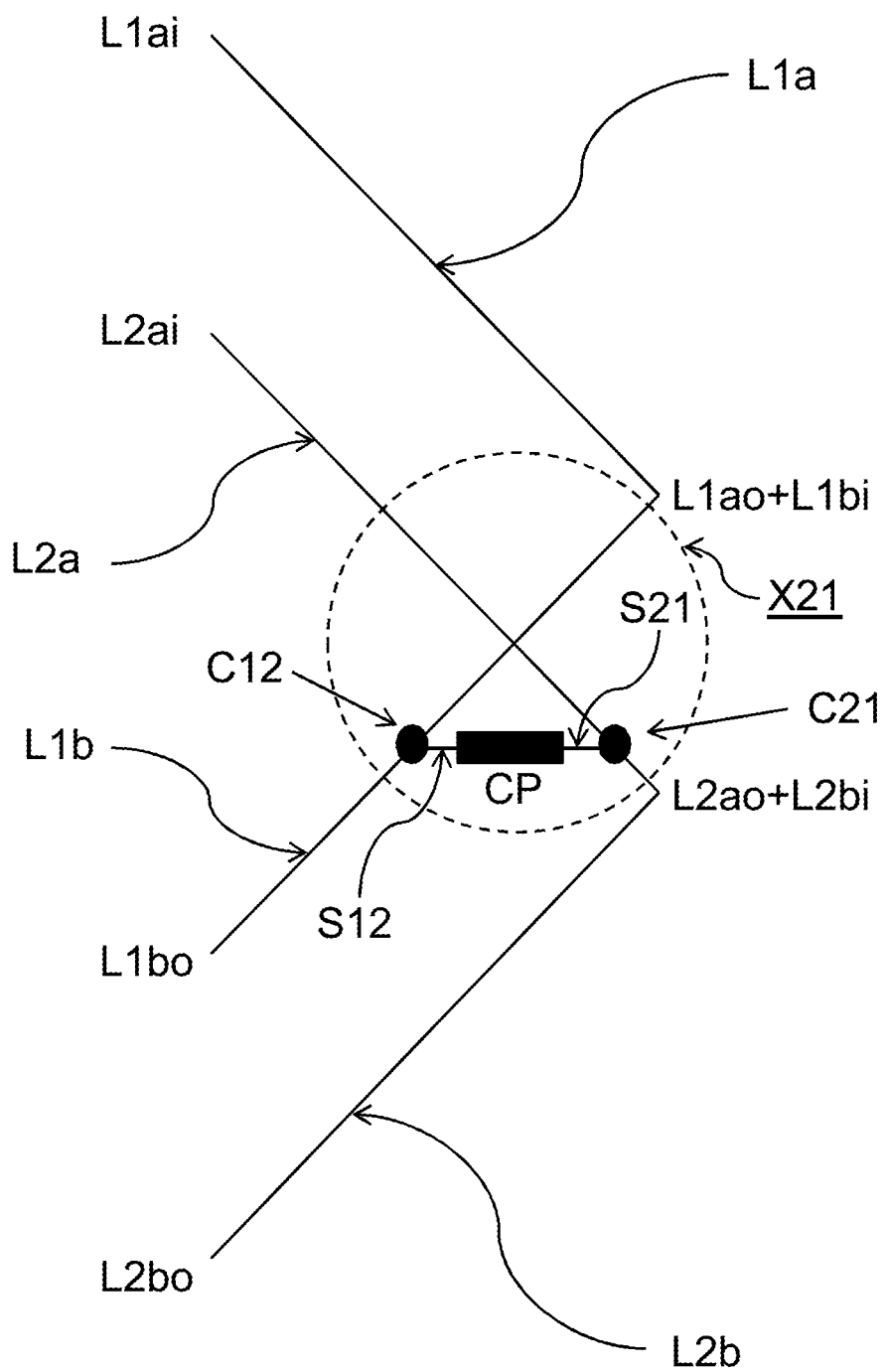
FIG. 5 shows a passive coupling element connected between two distinct emulation paths of the crosstalk emulator.

The topology allows coupling any N individual wires or N differential pairs or M×N lines (where M can be any number), just by copying the structure with a shift. The coupling element CP, as shown at FIG. 5, can be as simple as a single passive component, e.g. a capacitor, resistor or coil, but it can also be a more complex passive or active circuit or filter.

The coupling element CP is provided at the cross-point, e.g. X21, between two distinct emulation paths and as close as possible to the junction points L1ao+L1bi and L2ao+L2bi of their segments. This way, the coupling can be realized with minimal impact on xDSL performance.

In more detail, the coupling element CP is a passive coupling element that has one end S21 connected at C21 to the first segment L2a of the second emulation path and has the other end S12 connected at C12 to the second segment L1b of the first emulation path.

It is to be noted that the ends S21 and S12 of the coupling element CP are preferably as short as possible.

Such a simple cross connection allows emulating the crosstalk coupling of a large number of differential pairs of a heavy multi-pair cable.

A DSL cable generally comprises differential telecommunication pairs of wires, tip and ring, wherein each first wire of a pair is represented by an emulation path in a first crosstalk emulator as described above. Each second wire of a pair is then represented by a second emulation path in a second crosstalk emulator, similar but distinct from the first crosstalk emulator. The second emulation paths are arranged in a similar way as the first emulation paths.

In more detail, the first emulation paths are located on a first area of the printed circuit board PCB, whilst the second emulation paths are located on a second area of this PCB. The emulation paths of the second area are shifted with respect to the emulation paths of the first area. This shifting can also be realized by locating the first and second emulation paths on different layers of the printed circuit board PCB.

It is to be noted that a coupling element may be provided in the proximity of a cross-point between an emulation path of said first area and an emulation path of said second area.

More specifically, the tip, respectively ring, wire of each differential pair is coupled by means of a single passive coupling element to the tip, respectively ring, wire of every other differential pair.

It is to be noted that the coupling element may be more complex as described above. It may for instance comprise more components, and the components on tip and ring can be interconnected to form a more complex filter.

It is further possible to extend the above crosstalk emulator from N×N to 2N×2N by using the same principal concept but arranged as described below.

Such a 2N×2N or double crosstalk emulator is a crosstalk emulator arrangement comprising four crosstalk emulators CCE1 to CCE4 each similar to the above described crosstalk emulator and comprising N, e.g. 4, emulation paths.

Figure 6:
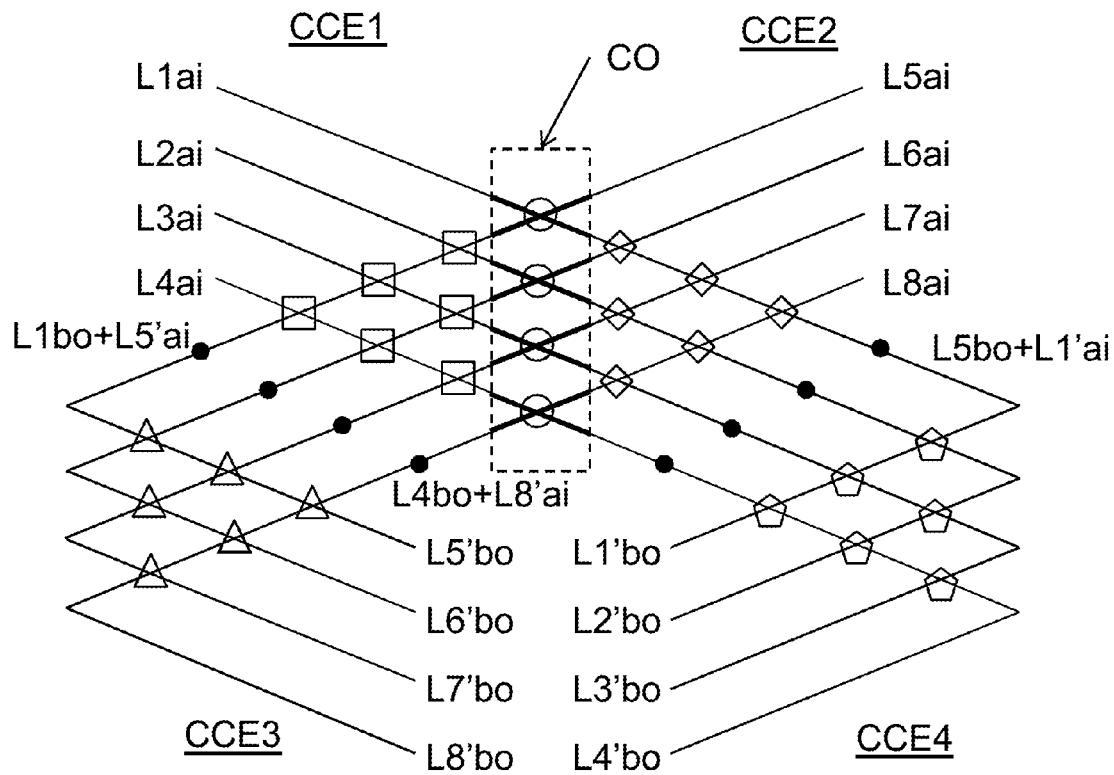
FIG. 6 shows a larger crosstalk emulator arrangement comprising several crosstalk emulators, as well as a table indicating the cross-points between the paths.

In this crosstalk emulator arrangement, shown at FIG. 6, the first segment inputs L1ai–L4ai; L5ai–L8ai of the first CCE1 and of the second CCE2 crosstalk emulators constitute the 2N (2*4=8) emulation path inputs, whilst the second segment outputs L5'ai–L8'ai/L1'ai–L4'ai of the third CCE3 and of the fourth CCE4 crosstalk emulators constitute the 2N emulation path outputs.

Figure 7A:
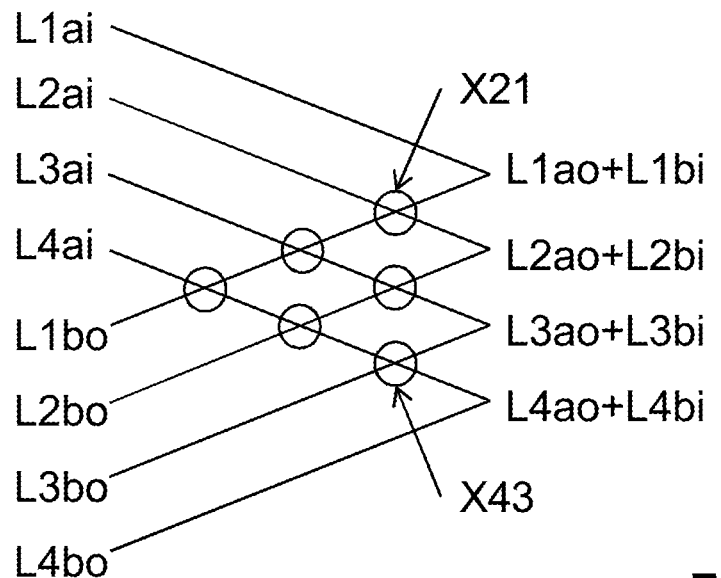
FIGS. 7a and 7b show details of the crosstalk emulator arrangement of FIG. 6.
Figure 7B:
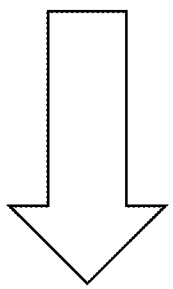
Figure 7B:
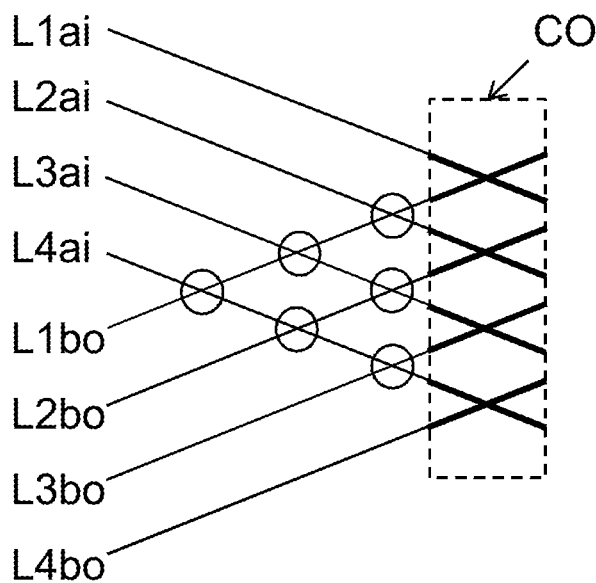

Moreover, as shown in the FIGS. 7a and 7b, each emulation path of the first crosstalk emulator CCE1 has its first segment output L1ao/L4ao disconnected from its second segment input L2bi/L4bi at the respective junction points L1ao+L1bi/L4ao+L4bi.

Similarly, the first segment output L5ao/L8ao of each emulation path of the second crosstalk emulator CCE2, is disconnected from the second segment input L5bi/L8bi of that path at their points L5ao+L5bi/L8ao+L8bi.

The so-disconnected junction points L1ao+L1bi–L4ao+L4bi and L5ao+L5bi–L8ao+L8bi are replaced by connections CO.

The connections CO connect each first segment output L1ao–L4ao of the first crosstalk emulator CCE1 to a distinct second segment input L5bi–L8bi of the second crosstalk emulator CCE2, and they further connect each first segment output L5ao–L8ao of the second crosstalk emulator CCE2 to a distinct second segment input L1bi–L4bi of the first crosstalk emulator CCE1.

Finally, each second segment output L1bo–L4bo of the first crosstalk emulator CCE1 is connected to a distinct first segment input L5'ai–L8'ai of the third crosstalk emulator CCE3, whilst each second segment output L5bo–L8bo of the second crosstalk emulator CCE2 is connected to a distinct first segment input L1'ai–L4'ai of the fourth crosstalk emulator CCE4.

In this crosstalk emulator arrangement, coupling elements as CP are provided at each cross-point between two distinct emulation paths within a same crosstalk emulator CCE1, CCE2, CCE3 or CCE4. These are represented in a table shown at FIG. 6: for CCE1 to CCE4 there are respectively squares, diamonds, triangles and pentagons. It can be seen that adding CP elements on the interconnect between CCE1 and CCE2, (represented by circles) completes the table, and therefore makes up for a full 2N×2N crosstalk emulator arrangement.

It is to be noted that the above-mentioned 2N×2N crosstalk emulator arrangement may be extended to a higher number of tracks by extrapolation with even more crosstalk emulators. These additional crosstalk emulators are then for instance connected to the junction points of the third CCE3 and/or the fourth CCE4 crosstalk emulators.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is merely made by way of example and not as a limitation on the scope of the invention, as defined in the appended claims.

What is claimed is:

1. A crosstalk emulator for a cable comprising a plurality of wires,
    each wire of said plurality corresponding to a distinct emulation path on a printed circuit board PCB of said crosstalk emulator,
    each emulation path comprising a first segment serially connected to a second segment and
    all the emulation paths of said plurality being arranged to cross each other on different layers at predetermined cross-points,
    wherein for each emulation path, one end of a said first segment is a first segment output and one end of a said second segment is a second segment input,
    for each emulation path, said first segment output is connected to said second segment input at a junction point so that said first and second segments form an angle at said junction point,
    and each emulation path of said plurality crosses only once any other emulation path of said plurality at one predetermined cross-point.

2. The crosstalk emulator according to claim 1, wherein a coupling element is provided in the proximity of a cross-point between two emulation paths.

3. The crosstalk emulator according to claim 2, wherein said coupling element has one end connected to the first segment of one emulation path and has the other end—connected to the second segment of another emulation path of said plurality.

4. The crosstalk emulator according to claim 1, wherein each emulation path has an emulation path input corresponding to a first segment input at the second end of a first segment of said emulation path,
    each emulation path has an emulation path output corresponding to a second segment output at a second end of a second segment of said emulation path,
    said first segment input and said first segment output are at opposite ends of said first segment, and
    said second segment input and said second segment output are at opposite ends of said second segment.

5. The crosstalk emulator according to claim 1, wherein all the emulation paths of said plurality have a same predetermined length.

6. The crosstalk emulator according to claim 1, wherein all the first segments are running in parallel on the PCB, and
    all the second segments are running in parallel on the PCB.

7. The crosstalk emulator according to claim 1, wherein said cable is a DSL telecommunication cable.

8. The crosstalk emulator according to claim 1, wherein said cable further comprises a second plurality of wires,
    each wire of said second plurality corresponding to a distinct emulation path on said printed circuit board PCB of said emulator,
    the emulation paths corresponding to the wires of said second plurality are arranged in a similar way as the emulation paths corresponding to the wires of the first mentioned plurality,
    the emulation paths of said first plurality are located on a first area of said printed circuit board PCB, and
    the emulation paths of said second plurality are located on a second area of said printed circuit board PCB.

9. The crosstalk emulator according to claim 8, wherein the emulation paths of said second area are shifted with respect to the emulation paths of said first area.

10. The crosstalk emulator according to claim 9, wherein the emulation paths of said first area and the emulation paths of said second area are located on different layers of said printed circuit board PCB.

11. The crosstalk emulator according to claim 8, wherein a coupling element is provided in the proximity of a cross-point between an emulation path of said first area and an emulation path of said second area.

12. The crosstalk emulator according to claim 8,
    wherein said cable is a DSL telecommunication cable comprising a plurality of differential telecommunication pairs of wires, and said first plurality of emulation paths corresponds to a first set of wires comprising the first wire of each of said pairs, whilst said second plurality of emulation paths corresponds to a second set of wires comprising the second wire of each of said pairs.

13. A crosstalk emulator arrangement, wherein
    said crosstalk emulator arrangement comprises four similar crosstalk emulators each according to claim 1, and comprising N emulation paths,
    for each emulation path of a first crosstalk emulator, the first segment output is disconnected from the second segment input,
    for each emulation path of a second crosstalk emulator, the first segment output is disconnected from the second segment input,
    the first segment inputs of said first and second crosstalk emulators constitute the 2N emulation path inputs of said crosstalk emulator arrangement,
    the disconnected junction points of said first and second crosstalk emulators are replaced by connections wherein each first segment output of said first crosstalk emulator is connected to a distinct second segment input of said second crosstalk emulator, and
    each first segment output of said second crosstalk emulator is connected to a distinct second segment input of said first crosstalk emulator,
    each second segment output of said first crosstalk emulator is connected to a distinct first segment input of a third crosstalk emulator, and
    each second segment output of said second crosstalk emulator is connected to a distinct first segment input of a fourth crosstalk emulator,
    and the second segment outputs of said third and fourth crosstalk emulators constitute the 2N emulation path outputs of said crosstalk emulator arrangement.

14. The crosstalk emulator arrangement according to claim 13, wherein a coupling element is provided in the proximity of a cross-point between two distinct emulation paths within a same crosstalk emulator.

15. The crosstalk emulator arrangement according to claim 13, wherein a coupling element is provided in the proximity of at least one of said connections.

* * * * *